United States Patent
Guido et al.

(10) Patent No.: US 11,157,589 B2
(45) Date of Patent: Oct. 26, 2021

(54) METHOD AND SYSTEM TO CONTROL OPERATION OF A PORTLET

(75) Inventors: Patrick R. Guido, Cary, NC (US); Robert C. Leah, Cary, NC (US); Paul F. McMahan, Apex, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2430 days.

(21) Appl. No.: 11/839,850

(22) Filed: Aug. 16, 2007

(65) Prior Publication Data
US 2009/0049387 A1 Feb. 19, 2009
US 2011/0055704 A9 Mar. 3, 2011

Related U.S. Application Data

(63) Continuation of application No. 10/711,701, filed on Sep. 30, 2004, now Pat. No. 7,376,900.

(51) Int. Cl.
G06F 16/958 (2019.01)
G06F 3/01 (2006.01)
G06F 16/90 (2019.01)
G06F 8/30 (2018.01)

(52) U.S. Cl.
CPC ............. *G06F 16/958* (2019.01); *G06F 3/01* (2013.01); *G06F 8/30* (2013.01); *G06F 16/90* (2019.01)

(58) Field of Classification Search
CPC .. G06F 3/00; G06F 17/30873; G06F 17/3089; G06F 3/04812; G06F 8/38; G06F 9/4443; G06F 16/958
USPC ........................................................ 715/743
See application file for complete search history.

(56) References Cited

U.S. PATENT DOCUMENTS

| | | | | |
|---|---|---|---|---|
| 5,430,839 A * | 7/1995 | Jagannathan et al. | ........ | 715/802 |
| 5,483,632 A * | 1/1996 | Kuwamoto et al. | .......... | 715/708 |
| 5,677,710 A * | 10/1997 | Thompson-Rohrlich | ..... | 345/173 |
| 5,749,070 A * | 5/1998 | Gourdol | ........................ | 704/242 |
| 7,429,993 B2 * | 9/2008 | Hui | ................................ | 345/629 |
| 7,475,089 B1 * | 1/2009 | Geddes | | |
| 7,548,957 B1 * | 6/2009 | Wichmann et al. | .......... | 709/217 |
| 7,607,139 B2 * | 10/2009 | Laird et al. | .................... | 719/320 |
| 7,680,927 B2 * | 3/2010 | McMullen et al. | ........... | 709/224 |
| 2002/0152110 A1 | 10/2002 | Stewart et al. | | |
| 2002/0169852 A1 * | 11/2002 | Schaeck | ........................ | 709/218 |
| 2003/0126558 A1 * | 7/2003 | Griffin | .......................... | 715/513 |

(Continued)

OTHER PUBLICATIONS

Richmond, Alan, "HTML's META-tag: HTTP-EQUIV", Oct. 12, 1999, pp. 1-3.*

*Primary Examiner* — Sherief Badawi
*Assistant Examiner* — Le Nguyen
(74) *Attorney, Agent, or Firm* — Scott S. Dobson

(57) ABSTRACT

A method to control a portlet associated with a portal page may include deactivating a selected portlet in response to operating a deactivation feature. The method may also include reactivating the selected portlet in response to operating a reactivation feature. The method may also include freezing a portlet content in the selected portlet in response to deactivating the selected portlet. The method may further include disabling hyperlinks, buttons and other inputs to the selected portlet in response to deactivating the selected portlet. The method may further include reconfiguring a portal server to ensure that a portlet content of a selected portlet cannot be affected while the selected portlet is deactivated.

28 Claims, 7 Drawing Sheets

(56) References Cited

U.S. PATENT DOCUMENTS

| | | |
|---|---|---|
| 2003/0145275 A1* | 7/2003 | Qian et al. .................... 715/500 |
| 2003/0149722 A1 | 8/2003 | Jolley et al. |
| 2003/0167315 A1* | 9/2003 | Chowdhry et al. ........... 709/218 |
| 2004/0193699 A1* | 9/2004 | Heymann ......... G06F 17/30873 709/218 |
| 2004/0199541 A1* | 10/2004 | Goldberg etal. ........... 707/104.1 |
| 2004/0243928 A1 | 12/2004 | Hesmer et al. |
| 2005/0039134 A1* | 2/2005 | Wiggeshoff et al. ......... 715/752 |
| 2005/0050021 A1* | 3/2005 | Timmons ......................... 707/3 |
| 2005/0065913 A1* | 3/2005 | Lillie etal. ........................ 707/3 |
| 2005/0188051 A1* | 8/2005 | Sneh ............................. 709/213 |
| 2006/0041637 A1* | 2/2006 | Jerrard-Dunne ........ H04L 67/28 709/219 |
| 2006/0070002 A1* | 3/2006 | Guido etal. .................... 715/733 |
| 2006/0129935 A1* | 6/2006 | Deinlein etal. ............... 715/733 |
| 2007/0136329 A1* | 6/2007 | Kussmaul etal. ............. 707/100 |
| 2007/0214420 A1* | 9/2007 | Guertl etal. ................... 715/742 |
| 2007/0282673 A1* | 12/2007 | Nagpal etal. ................... 705/11 |

* cited by examiner

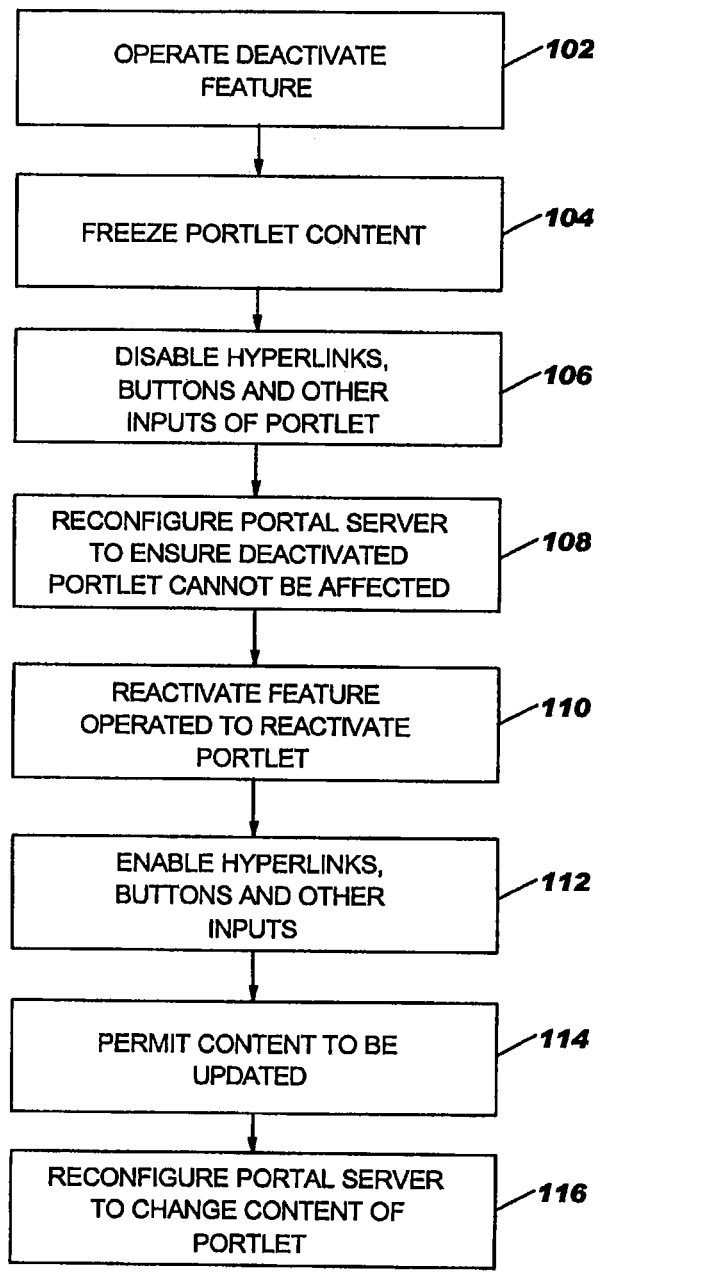

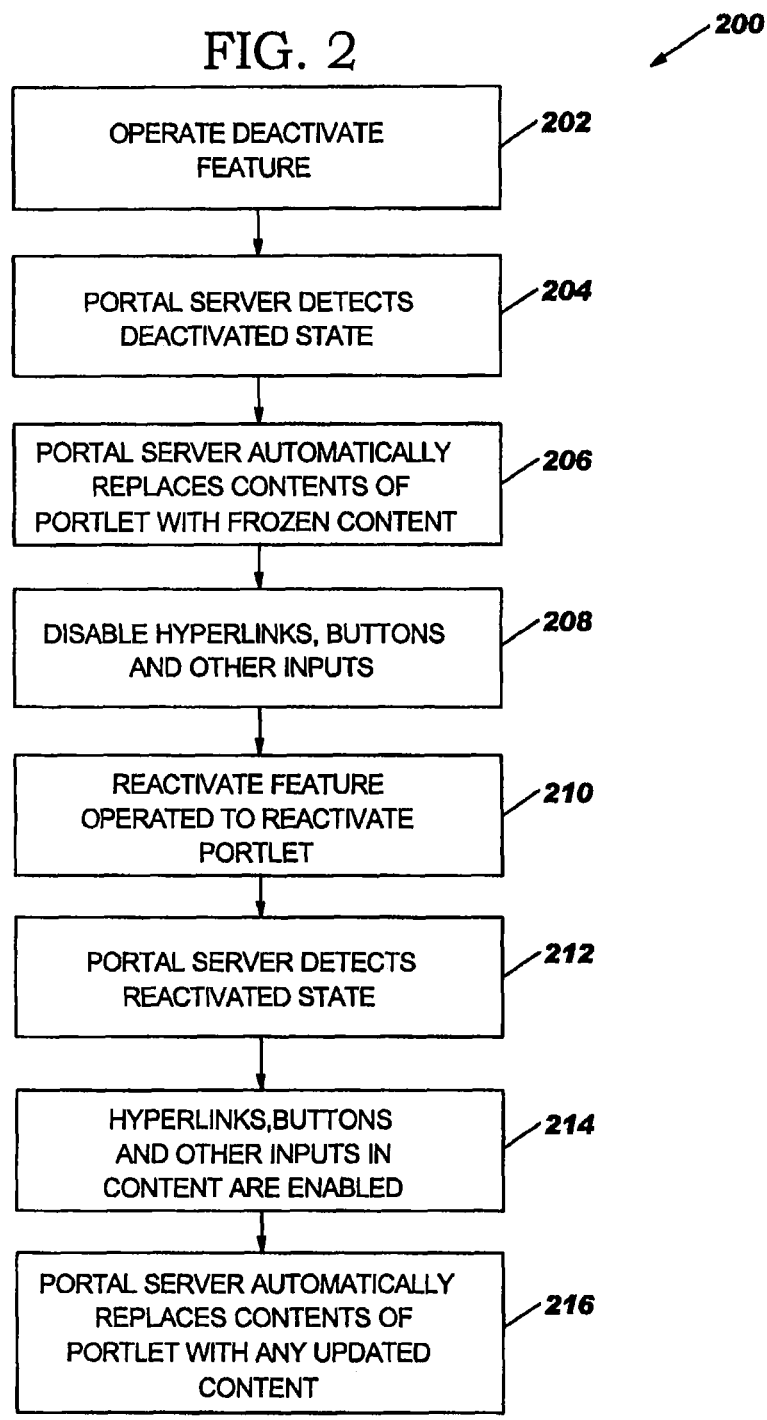

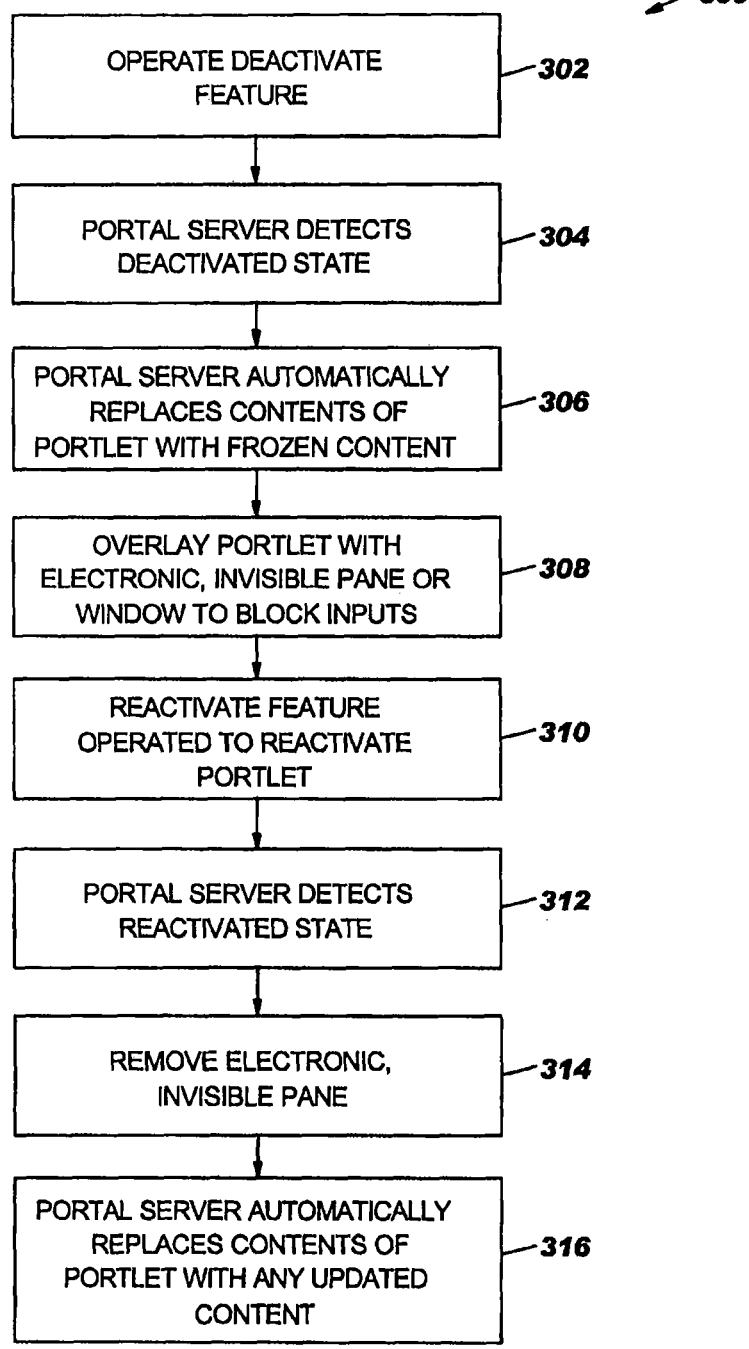

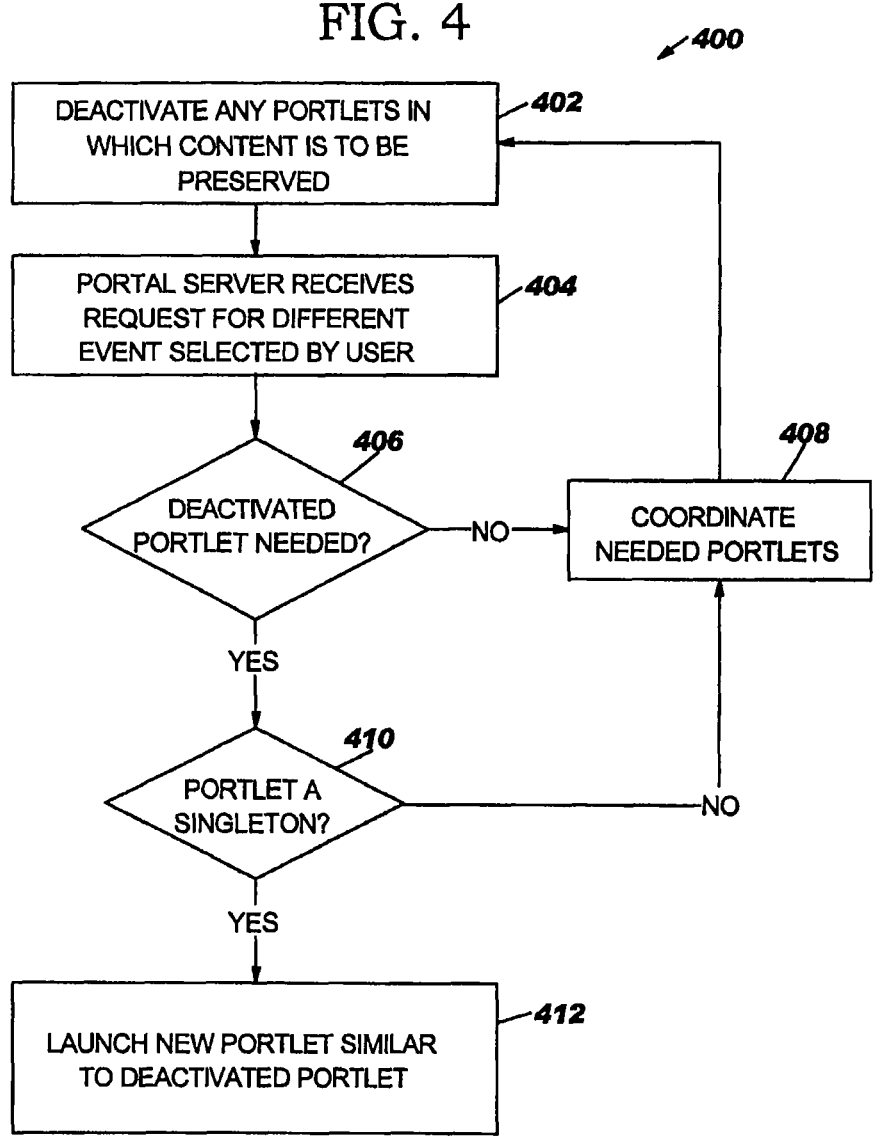

METHOD AND SYSTEM TO CONTROL OPERATION OF A PORTLET

CROSS-REFERENCE TO RELATED APPLICATION

This application is related to U.S. patent application Ser. No. 10/708,971, filed Apr. 5, 2004, entitled "Portal Including Detachable and Reattachable Portlets," which is incorporated herein in its entirety by reference and is assigned to the same assignee as this application.

This application is also related to U.S. patent application Ser. No. 10/710,943, filed Aug. 13, 2004, entitled "Detachable and Reattachable Portal Pages," which is incorporated herein in its entirety by reference and is assigned to the same assignee as this application.

This application is a continuation of U.S. patent application Ser. No. 10/711,701, filed Sep. 30, 2004, now U.S. Pat. No. 7,376,900, entitled "System and Method to Control Operation of a Portlet," the contents of which is are incorporated by reference herein in there entirety and is assigned to the same assignee as this application.

BACKGROUND OF INVENTION

The present invention relates to portlets and portal pages and more particularly to a method and system to deactivate and reactivate a portlet associated with a portal page or the like.

Portlets are a series of related tasks or portal applications presented to a user in a web page of a portal environment. A portal page may contain multiple portlets. Portlets are usually depicted as small boxes in a web page, portal or portal page. By default, portlets on a portal page may automatically pass content or data between each other to allow all portlets to synchronize the data they present based on an incident, event or task being performed. This behavior is in accordance with the standard Portal Development Model provided by portal servers such as the IBM Websphere Portal or the like. Portlets are reusable components that may provide access to applications, web-based content, and other resources. Whenever a portlet is reused or used in conjunction with a different request or event selected by a user, the contents of the reused portlet may be changed and the original or preceding content, information or data is lost. This is particularly the case with a singleton portlet. A singleton portlet is a portlet that only exist once on a given portal page. If the portlet doesn't already exit on the page, the portlet is created and passed context or content, if needed or called for to be used with respect to a particular operation, event or task. If the portlet already exists on the portal page, context or data may be passed to it to carry out the particular event, operation or task. For example, an operator or user may select an event in an event viewer portlet of a portal page. Selecting the event may launch a singleton portlet to perform a particular function in conjunction with the event viewer portlet, such as an event properties portlet to show the event properties information associated with the selected event. If the operator or user now selects a different event in the event viewer portlet, the context or content of the event properties singleton portlet will change to show the event properties information associated with the newly selected event and the former context or content will be replaced and lost. Because the event properties portlet is a singleton portlet, a new event properties portlet is not launched in response to selection of the new event. There may be times, however, when preserving the data or information in a portlet, whether a singleton or not, may be desired. Additionally, preserving, freezing or caching the data content of an individual portlet and changing the behavior of a portlet on a portal page may also be desirable under other circumstances, such as preserving data content across refreshes of the portal page, selectively toggling a portlet's ability to be targeted by a Portal Click-to-Action feature or similar circumstances. If a Portal Click-to-Action feature is enabled, a user can broadcast messages to all portlets on a portal page to further promote cooperation between the portlets but pre-existing content may be lost. In most cases, a user wants portlets to behave in this manner. However, under some circumstances, a user may want to freeze the content or deactivate a specific portlet and therefore does not desire this portlet behavior. Current portal server technology does not provide a means to avoid such behavior or to preserve or freeze content in a portlet.

SUMMARY OF INVENTION

In accordance with an embodiment of the present invention, a method to control operation of a portlet may include preserving, freezing or caching data or information in a selected portlet. The method may also include changing a behavior of the portlet on the portal page to prevent the portlet from being affected by refreshes across the portal page or to selectively toggle a portlet's ability to be targeted by a portal click-to-action feature or the like. The method may further include selectively ignoring the presence of a singleton portlet and creating a new instance of the singleton portlet if needed.

In accordance with another embodiment of the present invention, a method to control operation of a portlet associated with a portal page may include deactivating a selected portlet in response to operating a deactivation feature. The method may also include reactivating the selected portlet in response to operating a reactivation feature.

In accordance with another embodiment of the present invention, a method to control operation of a portlet associated with a portal page may include deactivating a selected portlet in response to operating a deactivation feature. The method may also include overlaying the selected portlet with an electronic pane or window to block all inputs of the selected portlet while the selected portlet is deactivated. The method may further include reactivating the selected portlet in response to operating a reactivation feature.

In accordance with another embodiment of the present invention, a portal page may include a plurality of portlets. The portal page may also include a deactivation feature associated with at least one of the plurality of portlets to deactivate the portlet to preserve a selected content of the at least one portlet.

In accordance with another embodiment of the present invention, a system to control operation of a portlet may include a portal server. The system may also include a portlet deactivation/reactivation feature, program or computer executable code operable on the portal server.

In accordance with another embodiment of the present invention, a computer-readable medium have computer-executable instruction for performing a method that may include deactivating a selected portlet in response to operating a deactivation feature. The method may also include reactivating the selected portlet in response to operating a reactivation feature.

BRIEF DESCRIPTION OF DRAWINGS

FIG. 1 is a flow chart of an exemplary method to control operation of a portlet associated with a portal page in accordance with an embodiment of the present invention.

FIG. 2 is a flow chart of an exemplary method to control operation of a portlet associated with a portal page in accordance with another embodiment of the present invention.

FIG. 3 is a flow chart of an exemplary method to control operation of a portlet associated with a portal page in accordance with a further embodiment of the present invention.

FIG. 4 is a flow chart of an exemplary method to launch a new instance of a singleton portlet in accordance with an embodiment of the present invention.

DETAILED DESCRIPTION

Figure 5A:
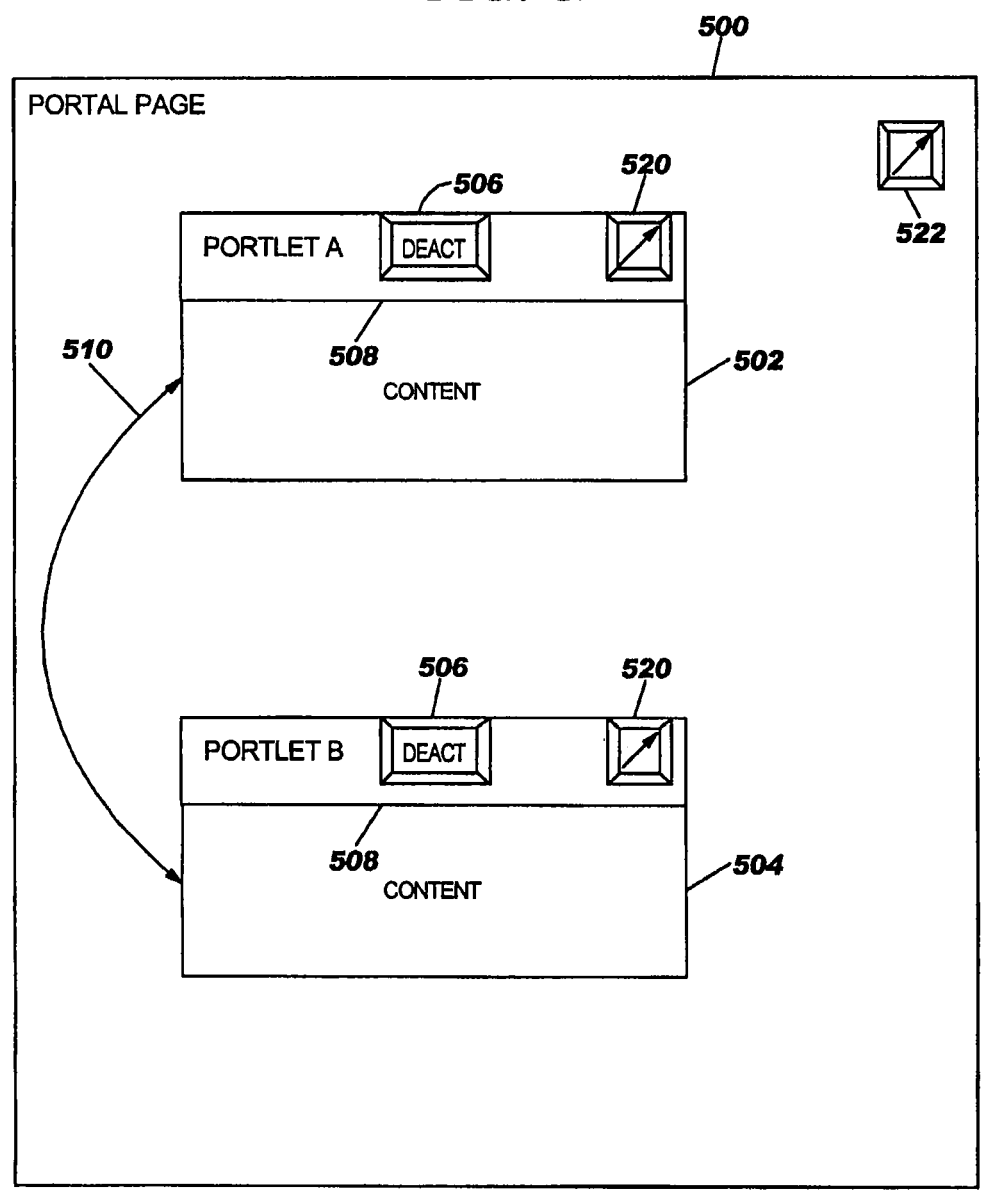
FIG. 5A illustrates an example of a portal page including portlets with a deactivation feature in accordance with an embodiment of the present invention.

The following detailed description of preferred embodiments refers to the accompanying drawings, which illustrate specific embodiments of the invention. Other embodiments having different structures and operations do not depart from the scope of the present invention.

FIG. 1 is a flow chart of an exemplary method 100 to control operation of a portlet associated with a portal page in accordance with an embodiment of the present invention. In block 102, a deactivate feature, icon or the like may be operated to deactivate a selected portlet. As described in more detail with respect to FIG. 5, a button or icon may be provided inside the contents of the portlet or in a title bar of the portlet that may be operated. The button or icon may be clicked on or otherwise operated by a computer pointing device, mouse or the like to transmit a request to a portal server to deactivate the portlet or switch the portlet to a deactivated mode or state. Alternatively, an application programming interface (API) may be provided in a portal server that may be toggled to switch a selected portlet between an active and deactivated state or mode. Using this API, a portlet may toggle its own activation state and other portlets can toggle the state as well. The portal page may include a plurality of portlets for performing different functions or tasks that may each include a deactivate feature or only certain portlets may be able to be deactivated.

In block 104, the content, data or information in the portlet may be frozen, preserved or cached in response to deactivating the selected portlet. A selected portlet may be deactivated by a user or operator to preserve the content, information or data contained in the portlet for various reasons or purposes, such as for future use or reference, for troubleshooting purposes or the like. In block 106, hyperlinks, buttons and other inputs of the selected portlet may be disabled in response to deactivating the selected portlet.

In block 108, a portal server may be reconfigured to ensure that the deactivated portlet cannot be affected while deactivated. The portal server may be reconfigured to prevent the deactivated portlet from being moved, closed or placed in edit mode or other condition that may permit the portlet and its contents to be affected or altered. The portal server may also disable any portlet messaging for the deactivated portlet. The deactivate feature permits a user or operator to have the portal server selectively ignore the presence of a singleton portlet and to create a new instance of the portlet if needed or called for use in another task, function or event. The deactivate feature also permits a user to preserve or freeze the data content of the selected, deactivated portlet across any refreshes of the portal page. The deactivation feature further permits a user or operator to selectively toggle a portlet's ability to be targeted by a portal click-to-action feature. Accordingly, the deactivation feature provides a means of "locking" a selected portlet in a portal page or portal environment under the control of a user or operator and may be provided as a feature of the portal server versus an internal application program interface (API).

In block 110, a reactivate feature or icon associated with the deactivated portlet may be operated to reactivate the portlet. In block 112, hyperlinks, buttons and other inputs associated with the portlet may be enabled in response to the portlet being reactivated or switched to an active state or mode. In block 114, updating the content of the portlet may be permitted. In block 116, the portal server may be reconfigured to permit alteration or changes to the content of the portlet. Accordingly, any refreshes of the portal page may now update the contents of the portlet and the portlet may now be targeted by any click-to-action messages.

FIG. 2 is a flow chart of an exemplary method 200 to control operation of a portlet associated with a portal page in accordance with another embodiment of the present invention. In block 202, a deactivate feature or icon may be operated to deactivate a selected portlet similar to that discussed with respect to method 100 of FIG. 1. In block 204, a portal server may detect that the selected portlet is deactivated or in a deactivated state. The portal server may detect that the portlet is in a deactivated state by sending a message to interrogate the portlet or the portlet may transmit a deactivation message to the portal server in response to being deactivated. In block 206, the portal server may automatically replace the contents of the portlet with frozen contents or contents that cannot be altered. In block 208, hyperlinks, buttons and other inputs associated with the portlet may be disabled.

In block 210, a reactivate feature or icon may be operated to reactivate the portlet or an API in the portal server may toggle to reactive the portlet. In block 212, the portal server may detect the reactivated state of the portlet. In block 214, hyperlinks, buttons and other inputs associated with the portlet may be enabled. In block 216, the portal server may automatically replace the contents of the portlet with any updated content.

FIG. 3 is a flow chart of an exemplary method 300 to control operation of a portlet associated with a portal page in accordance with a further embodiment of the present invention. In block 302, a deactivate feature may be operated to deactivate a selected portlet similar to that described with respect to blocks 102 and 202 in FIGS. 1 and 2, respectively. In block 304, a portal server may detect the deactivated state of the portlet. The deactivated state may be detected by the portal server interrogating the portlet or the portlet transmitting a message to the portal server in response to being deactivated. In block 306, the portal server may automatically replace the contents of the portlet with frozen contents or contents that cannot be altered or changed. Alternatively, the contents of the portlet may be cached or preserved when the portlet is deactivated.

In block 308, the deactivated portlet may be overlaid with an electronic, invisible pane or window to block the inputs of the deactivated portlet. The electronic pane prevents clicking on any hyperlinks, buttons or the like in the deactivated portlet and may block any communication with the portlet except to reactivate the portlet. The approach or technique used for the electronic pane or window may be similar to a "glass pane" used in Java® Swing, or the like. A "glass pane" associated with Java® Swing is useful to catch events or paint over an area that already contains one or more components. For example, mouse events can be deactivated for a multi-component region by having the glass pane intercept the events. The glass pane used to overlie a deactivated portlet in the present invention may use dynamic hypertext markup language (DHTML) or the like to create the glass pane that may be used in a manner very similar to how glass panes are used in Java® Swing. Alternative, an image can be displayed over multiple components using the glass pane. More details regarding Java® Swing and the "glass pane" concept may be found at the Sun Microsystems web site.

In block 310, a reactivate feature or icon may be operated to reactive the selected portlet. In block 312, the portal server may detect the reactivated portlet. The reactivated portlet may be detected by the portal server sending an interrogation message to the portlet or the portlet may transmit an active signal to the portal server in response to be reactivated. In block 314, the invisible pane blocking the inputs of the portlet may be removed to permit communication with the portlet. In block 316, the portal server may automatically replace the contents of the portlet with any updated contents.

FIG. 4 is a flow chart of an exemplary method 400 to launch a new instance of a singleton portlet in accordance with an embodiment of the present invention. In block 402, any selected portlets may be deactivated in which content is desired to be preserved similar to that described above. In block 404, a portal server may receive a request for a different event or task selected by a user in the portal page. In block 406, a determination may be made whether the request needs or calls for the use of any deactivated portlets. If no deactivated portlets are needed, the method 400 may advance to block 408 and use of the portlets needed for the event or task may be coordinated. The method 400 may then return to block 402 and continue as previously described. If a deactivated portlet is needed for the request or event in block 406, a determination may be made in block 410 if the portlet needed or called for is a singleton. If the portlet is not a singleton in block 410, the event or task may be performed using an existing instance of the portlet in block 408. If the portlet is a singleton in block 410, the method 400 may advance to block 412. In block 412, a new instance of the singleton portlet may be launched. In another embodiment of the present invention, a dialogue box may be presented to the user to warn the user that a singleton portlet is needed for the newly selected event or task and that at least some of the existing content may be replaced and lost if the singleton is reused. The user may then be given an option to reuse the singleton portlet or to preserve the content of the singleton portlet and to launch a new instance of the portlet.

FIG. 5 illustrates an example of a portal page 500 including a portlet A 502 and a portlet B 504 each with a deactivation feature in accordance with an embodiment of the present invention. The deactivation feature may be a button 506 labeled "DEACT," "DEACTIVATION" or other suitable identification indicating the function of the button or icon. The deactivation button 506 or icon may be located in the title bar 508 of each portlet 502 and 504 as illustrated in FIG. 5A. Alternatively, the deactivation button 506 or icon may be in the contents or body of the portlet 502 or 504. The portlets A and B 502 and 504 may communicate with one another as illustrated by the two way arrow 510.

Figure 5B:
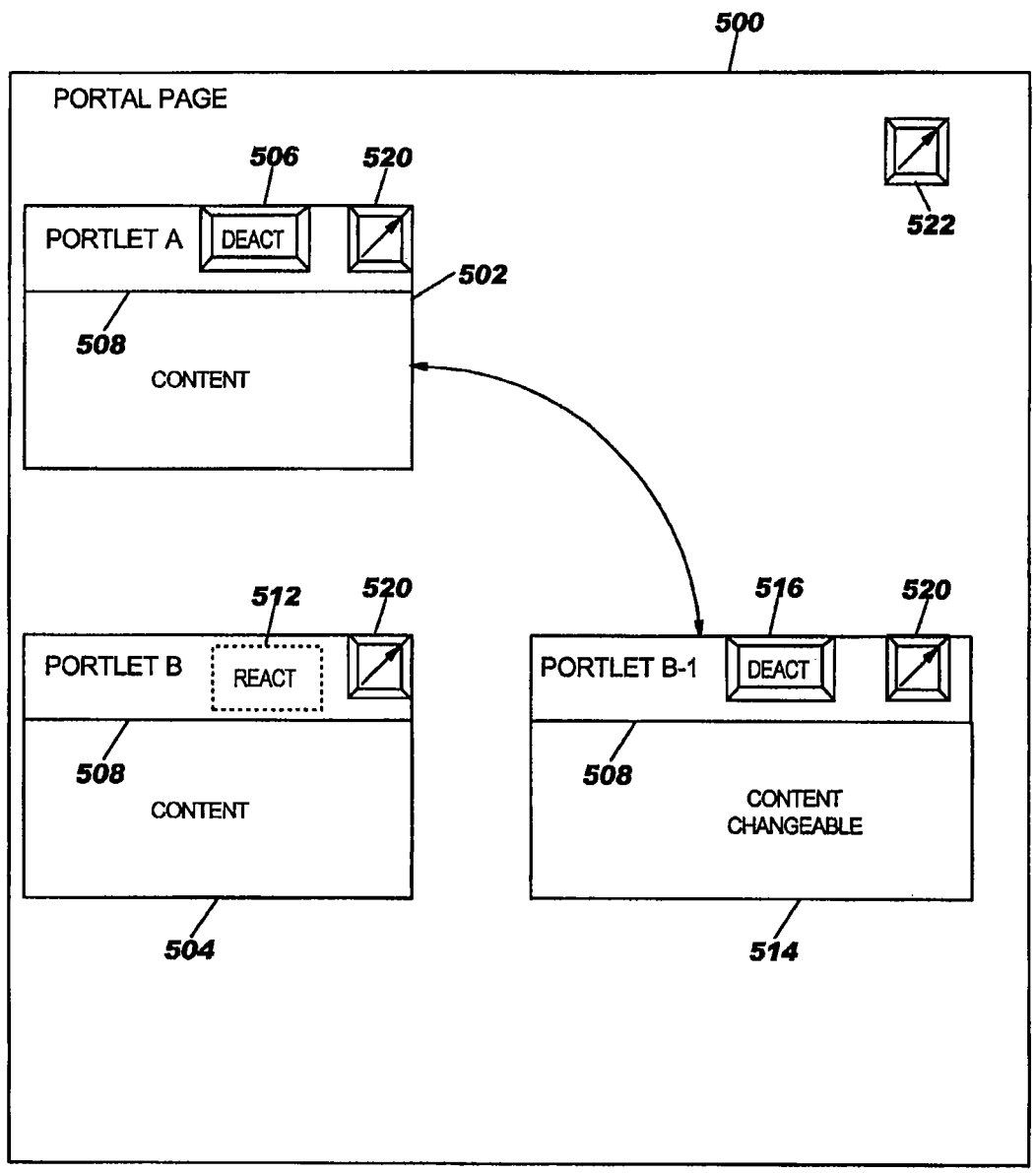
FIG. 5B illustrates an example of a portal page including a new instance of a singleton portlet in accordance with an embodiment of the present invention.

The portlets A and B 502 and 504 may be controlled or deactivated and reactivated similar to that described with respect to methods 100, 200 and 300 and 400 of FIGS. 1-4, respectively. Accordingly, portlet B 504 may be deactivated by operating the deactivate button 506 with a computer pointing device or the like. The content in portlet B 504 may then be frozen or preserved as illustrated in FIG. 5B in response to deactivating the portlet B 504. A reactivate feature may be provided in the deactivated portlet B 504. The reactivate feature may be a button 512 that may be labeled "REACT," "REACTIVATE" or a similar label identifying the function of the button or icon. The button 512 or icon may be in the title bar 508 as illustrated in FIG. 5B or somewhere in the contents or body of the portlet 504. The deactivate button 506 may be converted to the reactivate button 512 in the deactivated portlet B 504.

If portlet B 504 is a singleton portlet and a user selects another event or task that calls for use of the portlet B 504, another instance of portlet B or a new portlet similar to portlet B 504, portlet B-1 514, may be launched as illustrated in FIG. 5B. The process may be similar to that described with respect to method 400 of FIG. 4. The new portlet B-1 514 may also include a deactivation button 516 or icon.

The content of portlet B 504 may then be preserved or frozen and the content of new portlet B-1 514 may be changeable in the event the user selects a new event or task in the portal page 500, a refresh of the portal page 500 occurs, or a click-to-action or other occurrence takes place that may call for updating the content of the portal B-1 514. The portlet A 502 and portlet B-1 514 may communicate with one another as illustrated by arrow 518. Any hyperlinks, buttons (other than the reactivate button 512) or other inputs associated with portlet B 504 may be disabled or covered by an electronic, invisible pane to prevent portlet B 504 and its contents from being affected as described with respect to methods 100, 200 and 300 of FIGS. 1, 2 and 3, respectively.

The portlets 502, 504 and 514 may also include a portlet pop-out or portlet detach/reattach feature 520. The portlet pop-out feature or portlet detach/reattach feature 520 permits portlets to be detached from the portal page 500 for various reasons, such as to reduce congestion or clutter within a portal page with numerous portlets. The portlet detach/reattach feature may be similar to that described with respect to co-pending U.S. patent application Ser. No. 10/708,971, filed Apr. 5, 2004, entitled "Portal Including Detachable and Reattachable Portlets" which is incorporated herein by reference as indicated above.

The portal page 500 may also include a detach/reattach feature 522 to detach and reattach the portal page 500 to a portal environment. The portal page detach/reattach feature 522 may be similar to that described in co-pending U.S. patent application Ser. No. 10/710,943, filed Aug. 13, 2004, entitled "Detachable and Reattachable Portal Pages" which are incorporated herein by reference as recited above.

Figure 6:
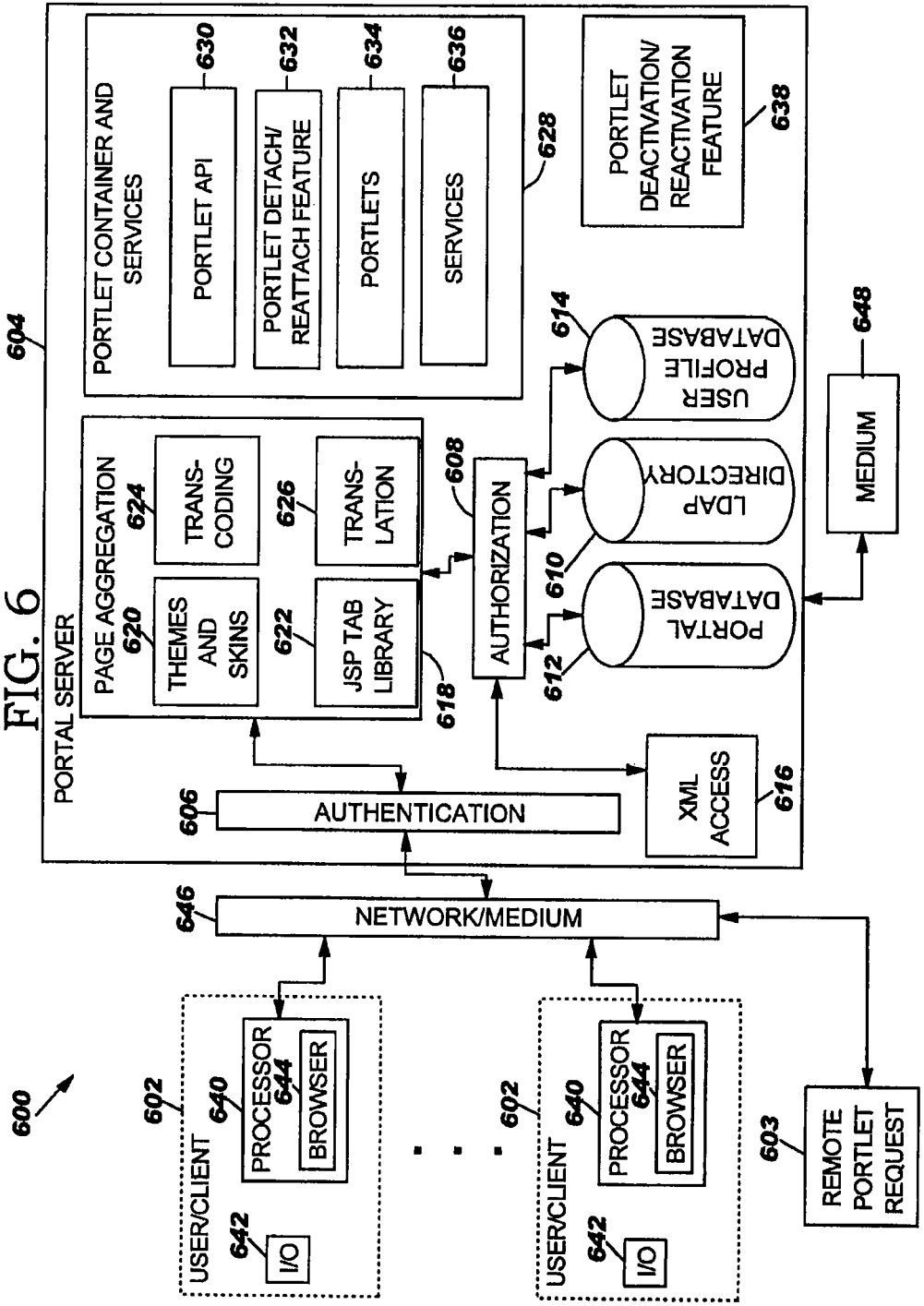
FIG. 6 is an example of a system to control operation of a portlet in accordance with an embodiment of the present invention.

FIG. 6 is an example of a system 600 to permit a user 602 to control operation of a portlet in accordance with an embodiment of the present invention. The user or client 602 may be a desktop or mobile computing system, cellular telephone, personal digital assistance or the like. The system 600 may also be accessed by a remote portlet request 603 from another server or system. Elements of the methods 100, 200, 300 and 400 of FIGS. 1, 2, 3 and 4 may be embodied in the system 600. The system 600 may include a portal server 604. The portal server 604 may provide common services, such as application connectivity, integration, administration, and presentation capabilities that may be needed across all portal environments. The portal server 604 may include an authentication element 606 to establish a user's identity. The portal server 604 may use form-based authentication. In form-based authentication, a user may be prompted through an HTML form or the like to enter a user ID and password for authentication when trying to access a particular portal, portal environment or website. After receiving the user's identification and password information, the portal server 604 may validate the authentication information via an authorization element 608. The portal server 604 may validate the authentication information against information contained in a Lightweight Directory Access Protocol (LDAP) directory 610. The authorization element 608 or process may also determine which pages or portlets a user has permission to access. The authorization element 608 may access the LDAP directory 610, a portal database 612, and a user profile database 614 in determining proper authentication, which portals are accessible by the user and other privileges or settings. The authorization element 608 may also interface with an extensible markup language (XML) access element 616.

The portal server 604 may also include a page aggregation element 618. Components of the page aggregation element 618 may be embodied in hardware or software. The page aggregation element 618 may include a themes and skins module 620. Users may be able to customize or personalize pages including for example, a choice of color themes, skins and page layouts. Themes may be used to define fonts, colors, spacing and other visual elements. Themes may consist of cascading style sheets, Java Script Page (JSP) files, images or the like. Skins may be decorations and controls placed around portlets, such as title bars, borders, shadows, or similar treatments. The page aggregation element 618 may also include a JSP tab library 622, transcoding module 624 and translation module 626 to further facilitate portal customization and presentation of the portal and portlets to the user 602.

The portal server 604 may also include a portlet container and services element 628. Components of the portlet container and services element 628 may be embodied in hardware or software. The portlet container and service element 628 may include a portlet Application Programming Interface (API) 630. Portlets rely on portal infrastructure to access user profile information, participate in window and action events, communicate with other portlets, access remote content, lookup credentials, store persistent data and perform other functions. The portlet API 630 provides standard interfaces for these functions or services.

The portlet container and services module 628 may also include a portlet detach/reattach feature 632. The portlet detach/reattach feature 632 may be similar to that described with respect to co-pending U.S. patent application Ser. No. 10/708,971, entitled "Portal Including Detachable and Reattachable Portlets," and co-pending U.S. patent application Ser. No. 10/710,943, entitled "Detachable and Reattachable Portal Pages." The portlet container and services module 628 may also contain portlets 634 or information to form portlets. The portlet container and services module 628 may also include other services or functions 636. Examples of other services or functions 636 may include, but is not limited to, content access, web page clipping, searching, document administration, portlet proxy, single signon and the like.

The server 604 may also include a portlet deactivation/reactivation feature 638, program or computer executable code. The portlet deactivation/reactivation feature 638 may be embodied in methods 100, 200, 300 and 400 of FIGS. 1, 2, 3 and 4, respectively. The portlet deactivation/reactivation feature may be part of the portlet container and services module 628 or a separate component as illustrated in FIG. 6 or portions of the portlet deactivation/reactivation feature may be contained in the module 628. The graphical user interfaces to form portal page 500 and portlets A and B 502 and 504 and new portlet B-1 514 in FIG. 5B may also be embodied in the portal server 604.

Each user 602 or client may include a processor 640 and input/output devices 642. A browser or web browser 644 may operate on the processor 640 to facilitate accessing the portal server 604. The input/output devices 642 may include separate input devices, output devices or combination input/output devices. The input/output devices 642 may include a keyboard, pointing device, voice recognition system or the like. The input/output devices 642 may also include optical, magnetic, infrared or radio frequency devices, disk drives or the like. The input devices 642 may receive read or download software, computer-executable or readable instructions or the like, such as software that may embody elements of the methods 100, 200, 300 and 400 of FIGS. 1, 2, 3 and 4.

Each user 602 may access the portal server 604 via a communication network or medium 646. The communication network or medium 646 may be any communication system including by way of example, dedicated communication lines, telephone networks, and wireless data transmission systems, two-way cable systems, and customized computer networks, interactive kiosk networks, the Internet and the like.

Elements of the present invention, such as methods 100, 200 and 300 and 400 of FIGS. 1, 2, 3 and 4 respectively, and system 600 of FIG. 6, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 600 of FIG. 6. Examples of such a medium may be illustrated in FIG. 6 as I/O devices 642 or medium 646 or 648. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method to control operation of a portlet associated with a portal page, comprising:
    deactivating a selected portlet in response to a user operating a deactivation feature presented in the selected portlet;
    freezing a portlet content in the selected portlet except a reactivation feature presented on the deactivated portlet in response to deactivating the selected portlet, wherein freezing the portlet content comprises preventing the portlet content from being altered across any refreshes of the portal page and wherein content of an active portlet associated with the portal page is changeable across any refreshes of the portal page;
    disabling hyperlinks, buttons and other inputs to the selected portlet in response to deactivating the selected portlet;
    reactivating the selected portlet in response to the user operating the reactivation feature presented in the deactivated selected portlet, wherein the deactivated selected portlet is prevented from being moved, closed, edited or affected; and
    enabling hyperlinks, buttons and other inputs to the selected portlet in response to reactivating the selected portlet.

2. The method of claim 1, further comprising reconfiguring a portal server associated with the portal page to ensure that a portlet content of the selected portlet cannot be affected while the selected portlet is deactivated.

3. The method of claim 1, further comprising detecting a deactivated state of the selected portlet.

4. The method of claim 1, further comprising automatically replacing, by a portal server, a content of the selected portlet with a frozen content in response to the portal server detecting a deactivated state of the selected portlet.

5. The method of claim 1, further comprising permitting a content of the selected portlet to be updated in response to reactivating the selected portlet.

6. The method of claim 1, further comprising launching a new portlet similar to the deactivated, selected portlet in response to a portal server receiving a request that calls for use of the deactivated, selected portlet if the deactivated, selected portlet is a singleton portlet.

7. The method of claim 1, wherein the reactivation feature comprises a reactivation button labeled to indicate a function of the deactivation button.

8. The method of claim 7, wherein the deactivation feature comprises a deactivation button labeled to indicate a function of the deactivation button.

9. The method of claim 1, further comprising:
    detecting that the selected portlet is deactivated by a portal server sending a message to interrogate the selected portlet; and
    replacing, by the portal server, contents of the selected portlet with frozen contents that cannot be altered in response to detecting that the selected portlet is deactivated.

10. The method of claim 1, further comprising:
    sending a message, by the selected portlet, to a portal server that the selected portlet is deactivated in response to the selected portlet being deactivated; and
    replacing, by the portal server, contents of the selected portlet with frozen contents that cannot be altered in response to detecting that the selected portlet is deactivated.

11. A method to control operation of a portlet associated with a portal page, comprising:
    deactivating a selected portlet in response to a user operating a deactivation feature presented in the portlet;
    overlaying the selected portlet with an electronic invisible pane or window in response to the selected portlet being deactivated to block, the portlet being visible through the electronic invisible pane or window and the electronic invisible pane or window blocking all inputs of die selected portlet while the selected portlet is deactivated except a reactivation feature presented in the selected portlet in response to the selected portlet being deactivated;
    reactivating the selected portlet in response to the user operating the reactivation feature presented in the deactivated selected portlet, wherein the deactivated selected portlet is prevented from being moved, closed, edited or affected;
    enabling hyperlinks, buttons and other inputs to the selected portlet in response to reactivating the selected portlet.

12. The method of claim 11, further comprising automatically replacing a content of the selected portlet with a frozen content in response to detecting a deactivated state of the selected portlet.

13. The method of claim 11, further comprising removing the overlaying pane in response to a portal server detecting a reactivated state of the selected portlet.

14. The method of claim 11, further comprising automatically replacing a frozen content of the selected portlet with any updated content in response to reactivating the selected portlet.

15. The method of claim 11, further comprising launching a new portlet similar to the deactivated, selected portlet in response to a portal server receiving a request that calls for the deactivated, selected portlet and the deactivated, selected portlet being a singleton portlet.

16. A method to control operation of a portlet associated with a portal page, comprising:
    deactivating a selected portlet by at least one of preserving, freezing or caching data or information in the selected portlet, wherein the selected portlet is deactivated in response to a user selecting a deactivation feature presented in the selected portlet;
    changing a behavior of the deactivated selected portlet on the portal page, wherein the deactivated selected portlet is prevented from being moved, closed, edited or affected except by a reactivate feature formed on the deactivated portlet in response to the selected portlet being deactivated;
    freezing a portlet content in the selected portlet except a reactivation feature presented on the deactivated portlet in response to deactivating the selected portlet, wherein freezing the portlet content comprises preventing the portlet content from being altered across any refreshes of the portal page and wherein content of an active portlet associated with the portal page is changeable across any refreshes of the portal page;
    disabling hyperlinks, buttons and other inputs to the selected portlet in response to deactivating the selected portlet;
    reactivating the selected portlet in response to the user operating the reactivation feature presented in the deactivated selected portlet; and
    enabling hyperlinks, buttons and other inputs to the selected portlet in response to reactivating the selected portlet.

17. The method of claim 16, further comprising selectively toggling the portlet to change the portlet's ability to be targeted by a poral click-to-action feature.

18. The method of claim 16, further comprising:
selectively ignoring a presence of a singleton portlet, wherein the selected, deactivated portlet is a singleton portlet; and
creating a new instance of the singleton portlet in response to the singleton portlet being needed to perform a task.

19. A method to form a portal page, comprising:
providing a plurality of portlets;
providing a deactivation feature associated with at least one of the plurality of portlets to deactivate the portlet to preserve a selected content of the at least one portlet, wherein the at least one of the plurality of portlets is deactivated in response to a user selecting the deactivation feature presented in the at least one of the plurality of portlets;
freezing a portlet content in the selected portlet except a reactivation feature presented on the deactivated portlet in response to deactivating the selected portlet, wherein freezing the portlet content comprises preventing the portlet content from being altered across any refreshes of the portal page and wherein content of an active portlet associated with the portal page is changeable across any refreshes of the portal page;
disabling hyperlinks, buttons and other inputs to the selected portlet in response to deactivating the selected portlet;
forming a reactivation feature presented on the at least one portlet in response to the at least one portlet being deactivated, wherein the deactivated portlet is prevented from being moved, closed, edited or affected, and wherein the deactivated portlet is reactivated in response to the user selecting the reactivation feature presented in the at least one of the plurality of portlets;
enabling hyperlinks, buttons and other inputs to the selected portlet in response to reactivating the selected portlet.

20. The method of claim 19, further comprising forming an invisible pane or window overlaying the at least one portlet to block all inputs of the at least one portlet except the reactivation feature while the at least one portlet is deactivated.

21. The method of claim 19, further comprising providing another portlet similar to the at least one portlet in response to a request that calls for use of the at least one portlet, if the at least one portlet is deactivated and a singleton portlet.

22. A method of making a system to control operation of a portlet, comprising:
providing a portal server;
providing a portlet deactivation feature for deactivation of the portlet in response to a user selecting the deactivation feature presented in the portlet;
providing a reactivation feature in the portlet in response to the portlet being deactivated, wherein the portlet is reactivated in response to the user selecting the reactivation feature in the portlet;
providing means for freezing a portlet content in a selected portlet in response to deactivating the selected portlet, except the reactivation feature presented on the deactivated portlet in response to deactivation of the portlet, wherein freezing the portlet content comprises preventing the portlet content from being altered across any refreshes of the portal page and wherein the content of an active portlet associated with the portal page is changeable across any refreshes of the portal page;
providing means for disabling hyperlinks, buttons and other inputs to a selected portlet in response to deactivating the selected portlet; and
providing means for enabling hyperlinks, buttons and other inputs to the selected portlet in response to reactivating the selected portlet,
wherein the deactivated selected portlet is prevented from being moved, closed, edited or affected.

23. The method of claim 22, further comprising providing means to reconfigure the portal server to ensure that a portlet content of a selected portlet cannot be affected while the selected portlet in deactivated.

24. The method of claim 22, further comprising providing means for automatically replacing, by the portal server, a content of a deactivated portlet with a frozen content in response to the portal server detecting a deactivated state of the portlet.

25. The method of claim 22, further comprising providing means for launching a new portlet similar to a deactivated portlet in response to the portal server receiving a request that calls for use of the deactivated portlet if the deactivated portlet is a singleton.

26. A non-transitory computer-readable medium comprising one from die group consisting of an electronic medium, a magnetic medium, an electromagnetic medium a semiconductor medium; having computer-executable instructions for performing a method, comprising:
deactivating a selected portlet in response to a user operating a deactivation feature provided in the selected portlet;
freezing a portlet content in the selected portlet in response to deactivating the selected portlet, wherein freezing the portlet content comprises preventing the portlet content from being altered across any refreshes of a portal page and wherein content of an active portlet associated with the portal page is changeable across any refreshes of the portal page;
disabling hyperlinks, buttons and other inputs to the selected portlet in response to deactivating the selected portlet; and
reactivating the selected portlet in response to the user operating a reactivation feature presented on the deactivated selected portlet, wherein the deactivated selected portlet is prevented from being moved, closed, edited or affected; and
enabling hyperlinks, buttons and other inputs to the selected portlet in response to reactivating the selected portlet.

27. The non-transitory computer-readable medium having computer executable instructions for performing the method of claim 26, further comprising reconfiguring a portal server associated with the portal page to ensure that a portlet content of the selected portlet cannot be affected while the selected portlet is deactivated.

28. The non-transitory computer-readable medium having computer executable instructions for performing the method of claim 26, further comprising overlaying the selected portlet with an electronic pane or window to block all inputs of the selected portlet while the selected portlet is deactivated.

* * * * *